(12) United States Patent
Nagoya

(10) Patent No.: US 8,065,322 B2
(45) Date of Patent: Nov. 22, 2011

(54) BINARY SEARCH CIRCUIT AND METHOD

(75) Inventor: Mitsugu Nagoya, Tokyo (JP)

(73) Assignee: Duaxes Corporation, Tokyo (JP)

( * ) Notice: Subject to any disclaimer, the term of this patent is extended or adjusted under 35 U.S.C. 154(b) by 445 days.

(21) Appl. No.: 12/158,618

(22) PCT Filed: May 22, 2006

(86) PCT No.: PCT/JP2006/310154
§ 371 (c)(1),
(2), (4) Date: Jun. 20, 2008

(87) PCT Pub. No.: WO2007/135727
PCT Pub. Date: Nov. 29, 2007

(65) Prior Publication Data
US 2009/0299971 A1    Dec. 3, 2009

(51) Int. Cl.
*G06F 7/00*    (2006.01)

(52) U.S. Cl. .................................. 707/769; 707/609

(58) Field of Classification Search ............. None
See application file for complete search history.

(56) References Cited

FOREIGN PATENT DOCUMENTS

| JP | 3-20822 | 1/1991 |
|----|---------|--------|
| JP | 4-180425 | 6/1992 |
| JP | 7-191824 | 7/1995 |
| JP | 11-85510 | 3/1999 |

OTHER PUBLICATIONS

English Patent Abstract of JP7-191824, published Jul. 28, 1995, 1 page.
Office Action in Japanese Patent Application No. 2006-541526 mailed Jan. 16, 2007, and English translation thereof (6 pages).
Office Action in Japanese Patent Application No. 2006-541526 mailed Mar. 6, 2007, and English translation thereof (3 pages).
International Search Report (Japanese and English) for PCT/JP2006/310154 mailed Aug. 15, 2006 (2 pages).
Patent Abstracts of Japan 04-180425 dated Jun. 26, 1992 (1 page).

*Primary Examiner* — Belix M Ortiz

(74) *Attorney, Agent, or Firm* — Ladas & Parry, LLP

(57) ABSTRACT

The present invention provides a technique for enabling high-speed binary search.
A binary search circuit 36 searches a database 50, which stores pieces of data aligned in ascending or descending order, for comparison target data by binary search. Comparison circuits 36A, 36B and 36C compare pieces of data read out from databases 50A, 50B and 50C with the comparison target data. A control circuit 36Z inputs each piece of data at the $1/2^n, 2/2^n, \ldots$, and $(2^n-1)/2^n$ positions in the search range of the database 50 into $2^n-1$ comparison circuits respectively and allows the comparison circuits to compare the pieces of data thus input with the comparison target data, so as to perform n searchs simultaneously in parallel.

5 Claims, 13 Drawing Sheets

| URL |
|---|
| http://www.xxx.xxx/x5.html |
| http://www.xx.xx/******** |
| ⋮ |

| MATCHED | PERMIT |
|---|---|
| NOT MATCHED | DISCARD |

| 62 | 64 |
|---|---|
| 0 | PERMIT |
| 3 | DISCARD |
| 4 | REPLACEMENT |
| 7 | ROUTING |
| 8 | SWITCHING |
| ⋮ | ⋮ |

60

BINARY SEARCH CIRCUIT AND METHOD

TECHNICAL FIELD

The present invention relates to a data processing technique, and particularly to a circuit and a method for searching a database for given data using a binary search method.

BACKGROUND ART

Due to improved Internet infrastructures and the widespread of communication terminals, such as cellular phone terminals, personal computers, and VoIP (Voice over Internet Protocol) phone sets, the number of Internet users is now exploding. Under such circumstances, security problems such as computer viruses, hacking and spam mails have become apparent, requiring appropriate techniques for communication control. Also, since improved communication environments have enormously increased communication traffic, there are required communication control apparatuses that enable high-speed processing of a large volume of data.

FIG. 1 shows a configuration of a conventional communication control apparatus 1. The conventional communication control apparatus 1 comprises a communication control unit 2 on the receiving side, a packet processing unit 3, and a communication control unit 4 on the sending side. The communication control units 2 and 4 include PHY processing units 5a and 5b for performing physical layer processing of packets, and MAC processing units 6a and 6b for performing MAC layer processing of packets, respectively. The packet processing unit 3 includes protocol processing units for performing protocol-specific processing, such as an IP processing unit 7 for performing IP (Internet Protocol) processing and a TCP processing unit 8 for performing TCP (Transport Control Protocol) processing. The packet processing unit 3 also includes an AP processing unit 9 for performing application layer processing. The AP processing unit 9 performs filtering or other processing according to data included in a packet.

[Patent Document 1] Japanese Patent Application Laid-open No. 4-180425.

DISCLOSURE OF INVENTION

Problem to be Solved by the Invention

The packet processing unit 3 of the conventional communication control apparatus 1 is implemented by software, using a general-purpose processor, or CPU, and an OS running on the CPU. With such configuration, however, the performance of the communication control apparatus 1 depends on the performance of the CPU, hampering the creation of a communication control apparatus capable of high-speed processing of a large volume of packets. For example, a 64-bit CPU can process only up to 64 bits at a time, and hence, there has existed no communication control apparatus having a higher performance than this.

In this way, although data communication speed between nodes has been remarkably improved thanks to the widespread of infrastructures including optical communication networks, such performance cannot be fully exhibited in practice because processing speed of communication control apparatuses becomes a bottleneck. Therefore, it is strongly desired that as high-speed communication control apparatuses as possible are provided promptly.

The present invention has been made in view of such a situation, and a general purpose thereof is to provide a technique for enabling high-speed communication environments.

Means for Solving the Problem

One aspect of the present invention relates to a binary search circuit. The binary search circuit searches a database, which stores pieces of data aligned in ascending or descending order, for comparison target data by binary search. The circuit comprises: $2^n-1$ comparison circuits which compare pieces of data read out from the database with the comparison target data; and a control circuit which controls the comparison circuits. When the search range of the database is divided into $2^n$, the control circuit inputs each piece of data at the $1/2^n$, $2/2^n$, ..., and $(2^n-1)/2^n$ positions in the search range into the $2^n-1$ comparison circuits respectively and allows the comparison circuits to compare the pieces of data thus input with the comparison target data, so as to perform n searchs simultaneously in parallel.

With such configuration described above, the time required to load the data from the database can be reduced. Also, the number of comparisons can be reduced by half, thereby reducing the search time.

The control circuit may determine if the comparison target data is found based on comparison results from the $2^n-1$ comparison circuits, and, when the comparison target data is not found, the control circuit may input, into the respective comparison circuits, each piece of data at the $1/2^n$, $2/2^n$, ..., and $(2^n-1)/2^n$ positions in a next search range defined based on the comparison results.

The binary search circuit may comprise $2^n-1$ of the databases connected to the respective comparison circuits. Accordingly, the control circuit may input pieces of data at the $1/2^n$, $2/2^n$, ..., and $(2^n-1)/2^n$ positions in the search range in parallel from the databases connected to the respective comparison circuits. Consequently, pieces of data can be loaded from databases into multiple comparison circuits in parallel, thereby further reducing the time for data loading.

The binary search circuit may be configured with a wired logic circuit. For example, the circuit may be configured using FPGA (Field Programmable Gate Array). By configuring a binary search circuit with a dedicated hardware circuit, a binary search circuit with desired performance can be achieved regardless of the performance of the CPU.

Another aspect of the present invention relates to a binary search method. In the binary search method, when a search range of a database storing pieces of data aligned in ascending or descending order is divided into $2^n$, each piece of data at the $1/2^n$, $2/2^n$, ..., and $(2^n-1)/2^n$ positions in the search range is input into $2^n-1$ comparison circuits respectively and the comparison circuits are allowed to compare the pieces of data thus input with comparison target data, so that n searchs are performed simultaneously in parallel.

Optional combinations of the aforementioned constituting elements, and implementations of the invention in the form of methods, apparatuses, systems, recording mediums and computer programs may also be practiced as additional modes of the present invention.

Advantageous Effects

The present invention provides a technique for enabling high-speed binary search.

BRIEF DESCRIPTION OF THE DRAWINGS

FIG. 4 is a diagram that shows a configuration of a position detection circuit.

FIG. 5 is a diagram that shows another example of the position detection circuit.

FIG. 13 is a diagram that shows still yet another example of internal data of the first database.

FIG. 14 is a diagram that shows an example of internal data of a second database.

FIG. 15 is a diagram that shows another example of internal data of the second database.

Figure 1:
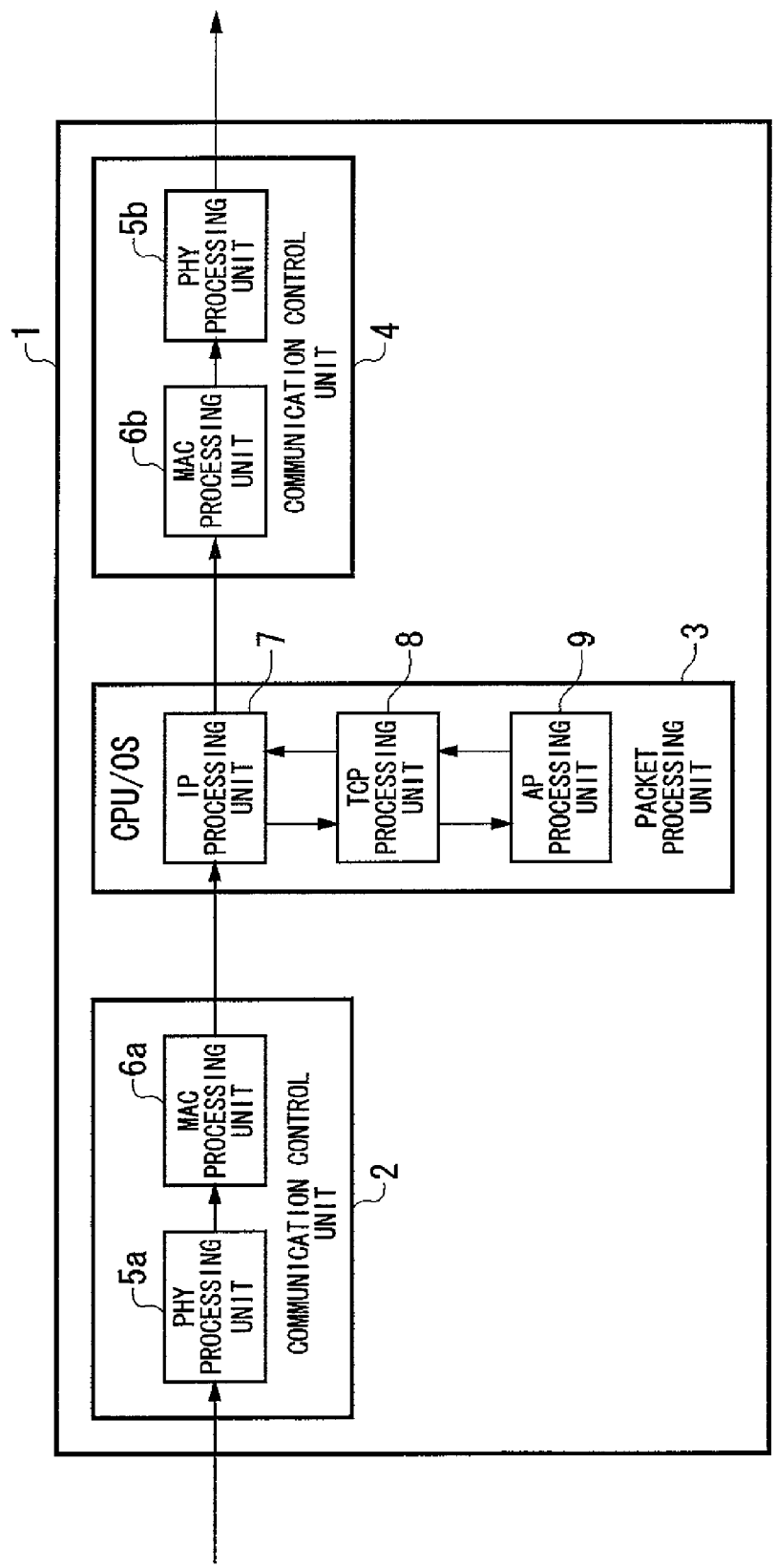
FIG. 1 is a diagram that shows a configuration of a conventional communication control apparatus.

EXPLANATION OF REFERENCE NUMERALS 10 communication control apparatus
20 packet processing circuit
30 search circuit
32 position detection circuit
33 comparison circuit
34 index circuit
35 comparison circuit
36 binary search circuit
36A, 36B and 36C comparison circuits
36Z control circuit
40 process execution circuit
50 first database
60 second database

BEST MODE FOR CARRYING OUT THE INVENTION

Figure 2:
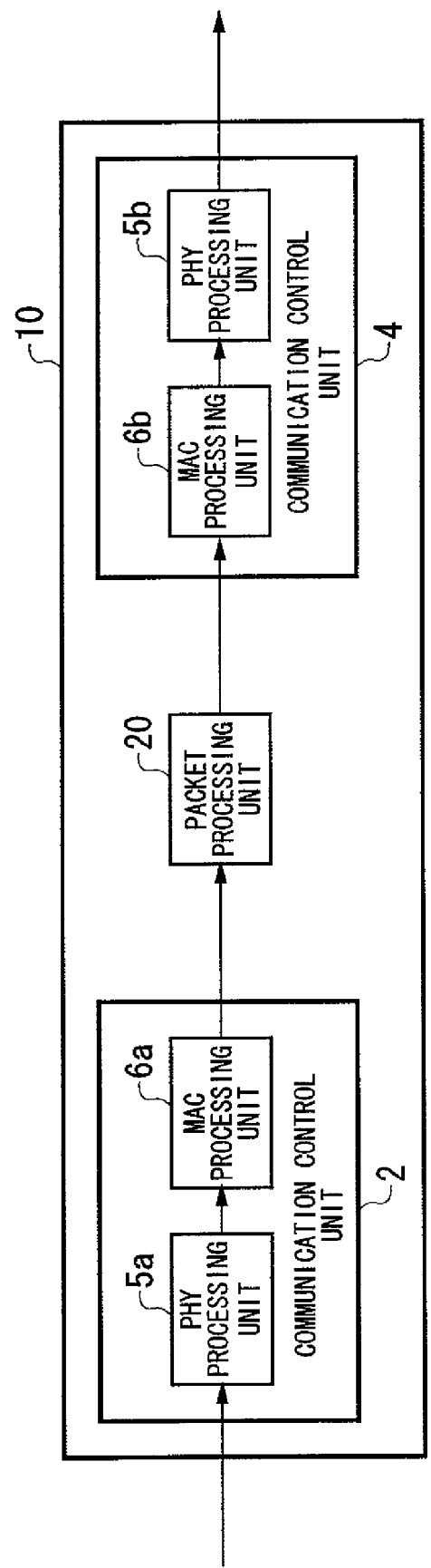
FIG. 2 is a diagram that shows a configuration of a communication control apparatus according to an embodiment.

FIG. 2 shows a configuration of a communication control apparatus, which serves as an example of a data processing apparatus of the present invention. A communication control apparatus 10 of the present embodiment comprises a packet processing circuit 20 configured with dedicated hardware employing a wired logic circuit, instead of a packet processing unit that is implemented by software including a CPU and an OS in a conventional communication control apparatus. By providing a dedicated hardware circuit to process communication data, rather than processing it with an OS and software running on a general-purpose processing circuit such as CPU, the performance limitations posed by the CPU or OS can be overcome, enabling a communication control apparatus having high throughput.

For example, a case will be considered here in which search is conducted in packet filtering or the like to check if the data in a packet includes reference data, which serves as criteria for filtering. When a CPU is used to compare the communication data with the reference data, there occurs a problem in that, since only 64-bit data can be compared at a time, the processing speed cannot be improved beyond such CPU performance. Since the CPU needs to repeat the process of loading 64 bits of communication data into a memory and comparing it with the reference data, the memory load time becomes a bottleneck that limits the processing speed.

In the present embodiment, by contrast, a dedicated hardware circuit configured with a wired logic circuit is provided to compare communication data with reference data. This circuit includes multiple comparators arranged in parallel, so as to enable the comparison of data having a length greater than 64 bits, such as 1024 bits. By providing dedicated hardware in such manner, bit matching can be simultaneously performed on a large number of bits in parallel. Since 1024-bit data can be processed at a time, while the conventional communication control apparatus 1 using a CPU processes only 64 bits, the processing speed can be improved remarkably. Increasing the number of comparators will improve the throughput, but also increase the cost and size of the apparatus. Accordingly, an optimal hardware circuit may be designed in accordance with the desired performance, cost or size.

Since the communication control apparatus 10 of the present embodiment is configured with dedicated hardware employing a wired logic circuit, it does not require any OS (Operating System). This can eliminate the need for the installation, bug fixes, or version upgrades of an OS, thereby reducing the cost and man-hours required for administration and maintenance. Also, unlike CPUs requiring versatile functionality, the communication control apparatus 10 does not include any unnecessary functions or use needless resources, and hence, reduced cost, a smaller circuit area or improved processing speed can be expected. Furthermore, again unlike conventional OS-based communication control apparatuses, the absence of unnecessary functions decreases the possibility of security holes and thus enhances the tolerance against attacks from malicious third parties over a network.

The conventional communication control apparatus 1 processes packets using software predicated on a CPU and an OS. Therefore, all packet data needs to be received before protocol processing is performed, and then the data is passed to an application. In contrast, since packet processing is performed by a dedicated hardware circuit in the communication control apparatus 10 of the present embodiment, all packet data need not be received before starting the processing; upon reception of necessary data, the processing can be started at any given point in time without waiting for the reception of subsequent data. For example, position detection processing in a position detection circuit, which will be described later, may be started at the time when position identification data for identifying the position of comparison target data is received. Thus, various types of processing can be performed in parallel without waiting for the reception of all data, reducing the time required to process packet data.

Figure 3:
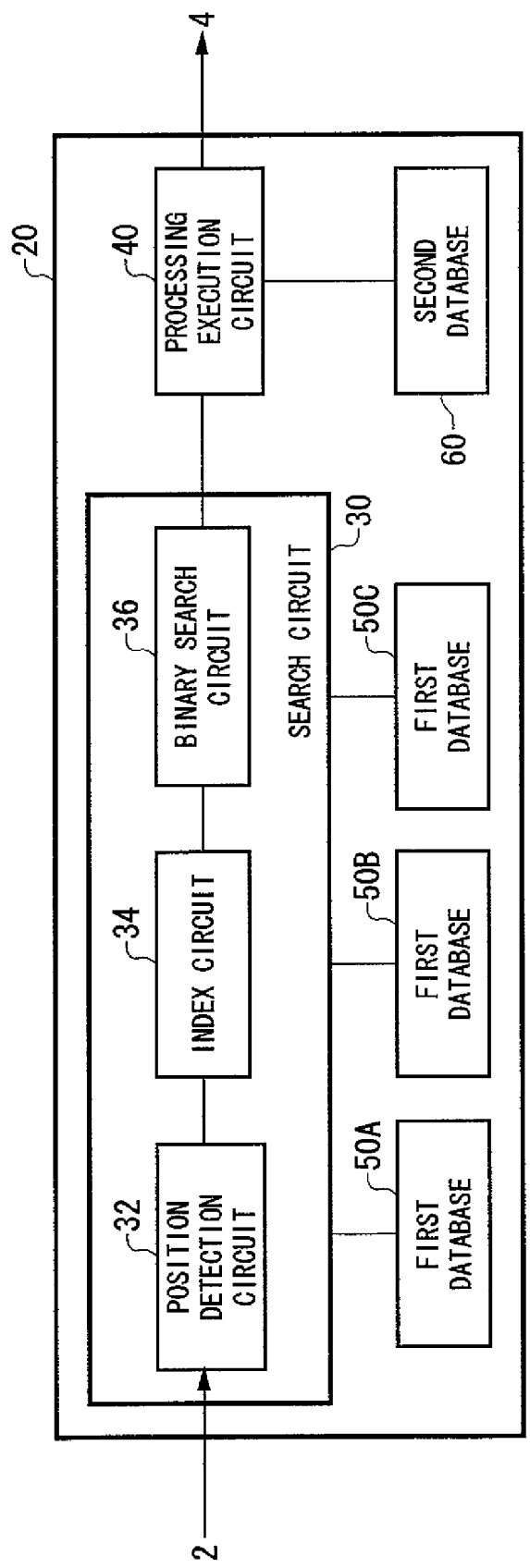
FIG. 3 is a diagram that shows a configuration of a packet processing circuit.

FIG. 3 shows an internal configuration of the packet processing circuit. The packet processing circuit 20 comprises: first databases 50A, 50B and 50C (hereinafter, they may be collectively referred to as "first databases 50") for storing reference data, which is referred to when processing to be performed on communication data is determined; a search circuit 30 for searching received communication data for the reference data by comparing the two; a second database 60 for storing a search result of the search circuit 30 and a content of processing to be performed on the communication data, which are related to each other; and a process execution circuit 40 for processing the communication data based on the search result of the search circuit 30 and the conditions stored in the second database 60.

The search circuit 30 includes: a position detection circuit 32 for detecting the position of comparison target data, which is to be compared with reference data, in communication data; an index circuit 34 which serves as an example of a determination circuit that determines which range the comparison target data belongs to among three or more ranges, into which the reference data stored in the first database 50 is divided; and a binary search circuit 36 for searching the determined range for the reference data that matches the comparison target data. The reference data may be searched for the comparison target data using any search technique, and a binary search method is used in the present embodiment. Since an improved binary search method is employed, as will be discussed later, three first databases 50 are provided in the present embodiment. The first databases 50A, 50B and 50C store the same reference data.

Figure 4:
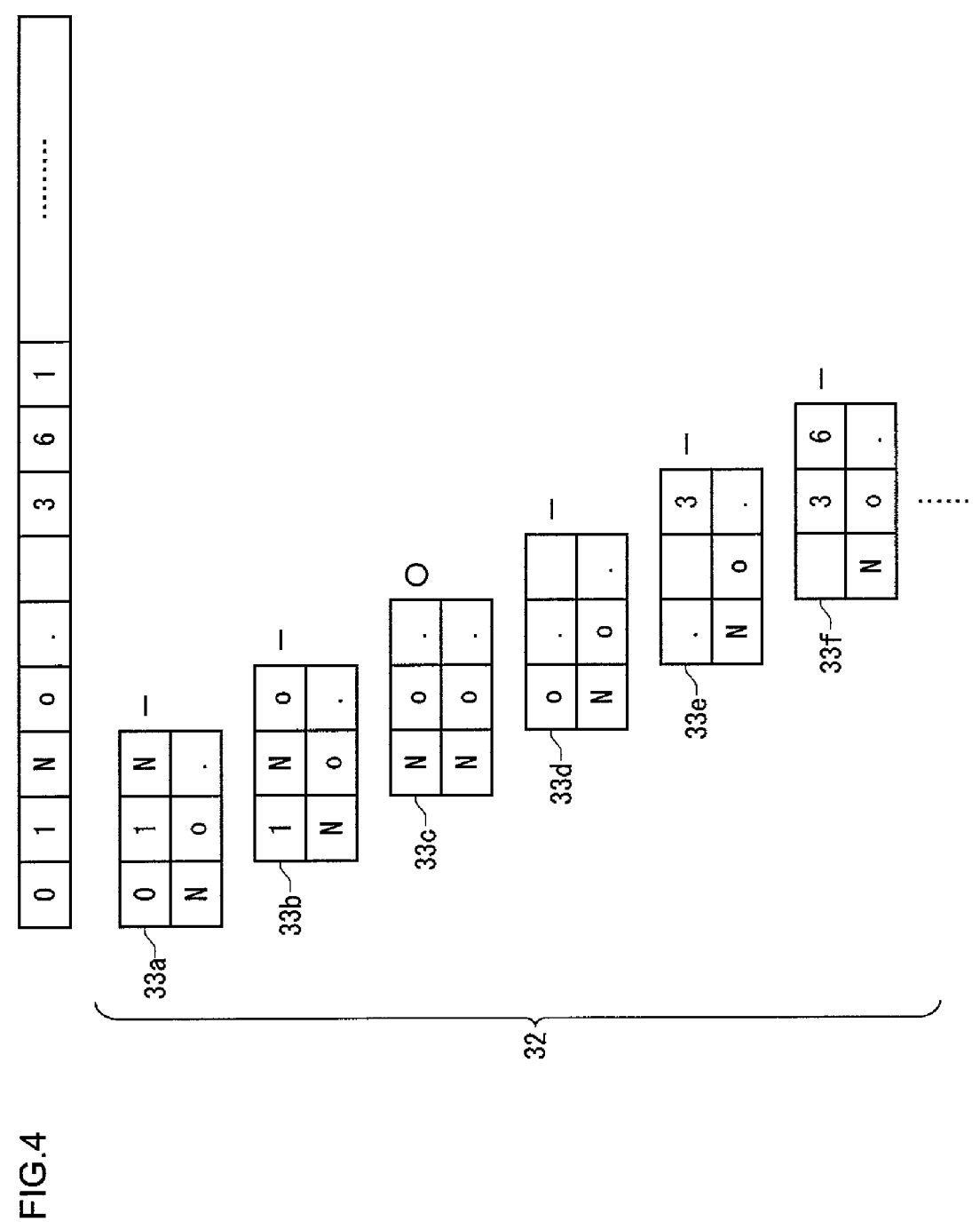

FIG. 4 shows an internal configuration of the position detection circuit. The position detection circuit 32 includes multiple comparison circuits 33a-33f that compare communication data with position identification data for identifying the position of comparison target data. While six comparison circuits 33a-33f are provided here, the number of comparison circuits may be arbitrary, as will be described later. To the comparison circuits 33a-33f are input pieces of communication data, with each piece shifted from the preceding one by a predetermined data length, such as 1 byte. These multiple comparison circuits 33a-33f then simultaneously compare the respective communication data with the position identification data to be detected in parallel.

The present embodiment will be described by way of example for explaining the operation of the communication control apparatus 10, in which a character string "No. ###" in communication data is detected, the number "###" included in the character string is then compared with reference data, and if the number matches the reference data, the packet will be allowed to pass, while, if they do not match, the packet will be discarded.

In the example of FIG. 4, communication data "01No. 361 . . . " is input to the comparison circuits 33a-33f with a shift of one character each, and position identification data "No." for identifying the position of the number "###" is sought to be detected in the communication data. More specifically, "01N" is input to the comparison circuit 33a, "1No" to the comparison circuit 33b, "No." to the comparison circuit 33c, "o. " to the comparison circuit 33d, ". 3" to the comparison circuit 33e, and "36" to the comparison circuit 33f. Then, the comparison circuits 33a-33f simultaneously perform comparisons with the position identification data "No.". Consequently, there is found a match with the comparison circuit 33c, indicating that the character string "No." exists at the third character from the top of the communication data. Thus, it is found that the numeral data as comparison target data exists subsequent to the position identification data "No." detected by the position detection circuit 32.

When the same processing is performed by a CPU, since the comparison process needs to be serially performed one by one from the top, such as comparing character strings "01N" and "No." before comparing "1No" and "No.", no improvement of detection speed can be expected. In the communication control apparatus 10 of the present embodiment, in contrast, providing the multiple comparison circuits 33a-33f in parallel enables simultaneous parallel comparison processing, which could not have been performed with a CPU, improving the processing speed significantly. Providing more comparison circuits will improve the detection speed, as more characters can be compared simultaneously. In consideration of cost or size, a sufficient number of comparison circuits may be provided to achieve a desired detection speed.

Aside from detecting position identification data, the position detection circuit 32 may also be used as a circuit for detecting character strings for various purposes. Moreover, the position detection circuit 32 may be configured to detect position identification data in units of bits, not just as a character string.

Figure 5:
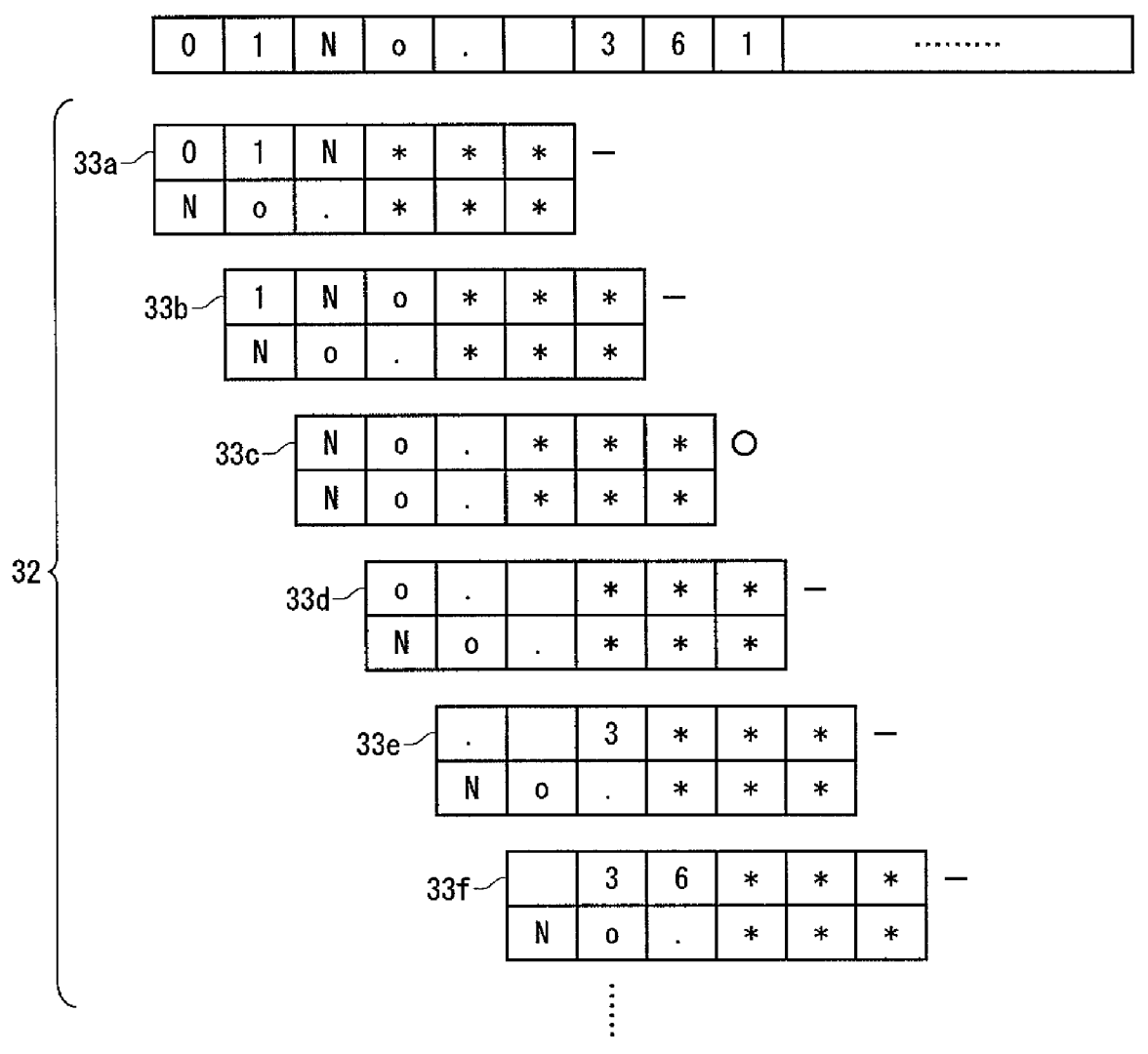

FIG. 5 shows another example of the position detection circuit. In the example shown in FIG. 5, when the data length of position identification data is shorter than that prepared in each of the comparison circuits 33a-33f in the position detection circuit 32, predetermined data, such as "00H" or "01H", is padded posterior to the position identification data. Similarly, with regard to communication data to be compared with position identification data, a data length identical with that of the position identification data is extracted from the communication data and input to a comparison circuit, and the same data as padded after the position identification data is also padded posterior thereto. In such case, the communication data may be copied as work, and the copied data may be processed to be input to the comparison circuits 33a-33f, so as not to change the original communication data. Thus, the position detection circuit 32 can be generally used regardless of the length of position identification data.

Figure 6:
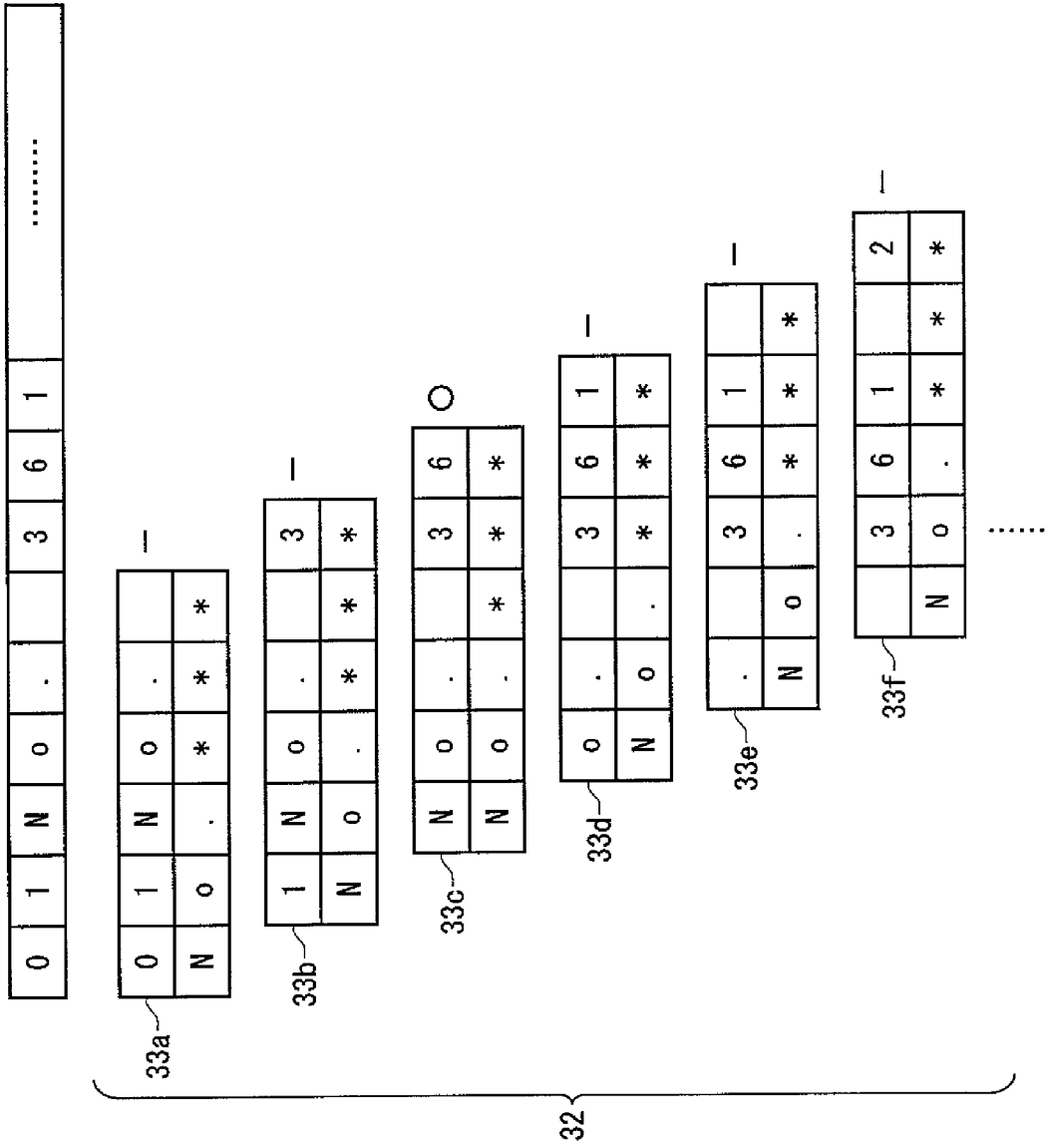
FIG. 6 is a diagram that shows yet another example of the position detection circuit.

FIG. 6 shows yet another example of the position detection circuit. In the example shown in FIG. 6, predetermined data is padded posterior to position identification data in the same way as shown in the example of FIG. 5, and, in addition, such data is regarded as a wild card. That is, when data is input as a wild card into the comparison circuits 33a-33f, it is determined that the corresponding part of target data to be compared matches the wild-card data whatever the target data is. Thus, the position detection circuit 32 can be generally used regardless of the length of position identification data.

Figure 7:
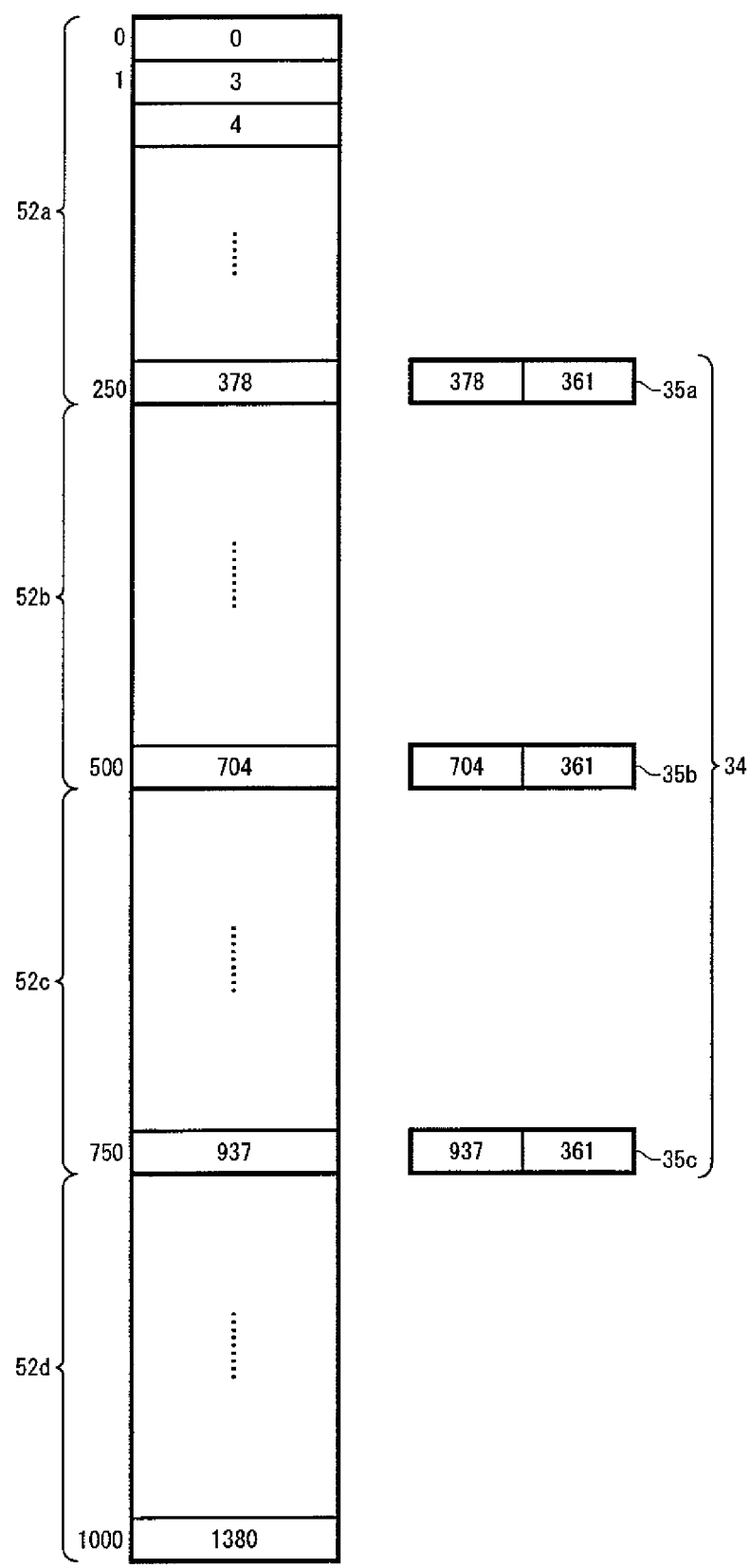
FIG. 7 is a diagram that shows an example of internal data of a first database.

FIG. 7 shows an example of internal data of the first database. The first database 50 stores reference data, which is referred to when processing on packets, such as filtering, routing, switching, or replacement, is determined. The pieces of reference data are sorted according to some sort conditions and stored in ascending or descending order. In the example of FIG. 7, 1000 pieces of reference data are stored.

The index circuit 34 determines which range comparison target data belongs to among three or more ranges, such as 52a-52d, into which reference data stored in the first database 50 is divided. In the example of FIG. 7, the 1000 pieces of reference data are divided into four ranges 52a-52d, i.e., 250 pieces each in a range. The index circuit 34 includes multiple comparison circuits 35a-35c, each of which compares a piece of reference data at the border of the range with the comparison target data. Since the comparison circuits 35a-35c simultaneously compare the pieces of reference data at the borders with the comparison target data in parallel, which range the comparison target data belongs to can be determined by a single operation of comparison processing.

The pieces of reference data at the borders to be input to the comparison circuits 35a-35c of the index circuit 34 may be set by an apparatus provided outside the communication control apparatus 10. Alternatively, reference data at predetermined positions in the first database 50 may be set in advance to be automatically input as such. In the latter case, even when the first database 50 is updated, the reference data at the predetermined positions in the first database 50 are automatically input to the comparison circuits 35a-35c. Therefore, the communication control processing can be performed immediately without initialization or the like.

As mentioned previously, CPU-based binary search cannot make multiple comparisons at the same time. In the communication control apparatus 10 of the present embodiment, in contrast, providing the multiple comparison circuits 35a-35c in parallel enables simultaneous parallel comparison processing, with a significant improvement in the search speed.

After the index circuit 34 determines the relevant range, the binary search circuit 36 performs search using a binary search method. The binary search circuit 36 divides the range determined by the index circuit 34 further into $2^n$ and subsequently compares the pieces of reference data lying at the borders with the comparison target data, thereby determining which range the comparison target data belongs to. The binary search circuit 36 includes multiple comparators for comparing, bit by bit, reference data with comparison target data. For example, in the present embodiment are provided 1024 comparators to perform bit matching on 1024 bits simultaneously. When the range to which the comparison target data belongs is determined among the $2^n$ split ranges, the determined range is further divided into $2^n$. Then, the pieces of reference data lying at the borders are read out to be compared with the comparison target data. Thereafter, this processing is repeated to narrow the range further until reference data that matches the comparison target data is eventually found.

The operation will now be described in more detail in conjunction with the foregoing example. Each of the comparison circuits 35a-35c of the index circuit 34 receives "361" as comparison target data. As for reference data, the comparison circuit 35a receives "378", which lies at the border of the ranges 52a and 52b. Similarly, the comparison circuit 35b receives reference data "704" lying at the border of the ranges 52b and 52c, and the comparison circuit 35c receives reference data "937" lying at the border of the ranges 52c and 52d. The comparison circuits 35a-35c then perform comparisons simultaneously, determining that the comparison target data "361" belongs to the range 52a. Subsequently, the binary search circuit 36 searches the reference data for the comparison target data "361".

Figure 8:
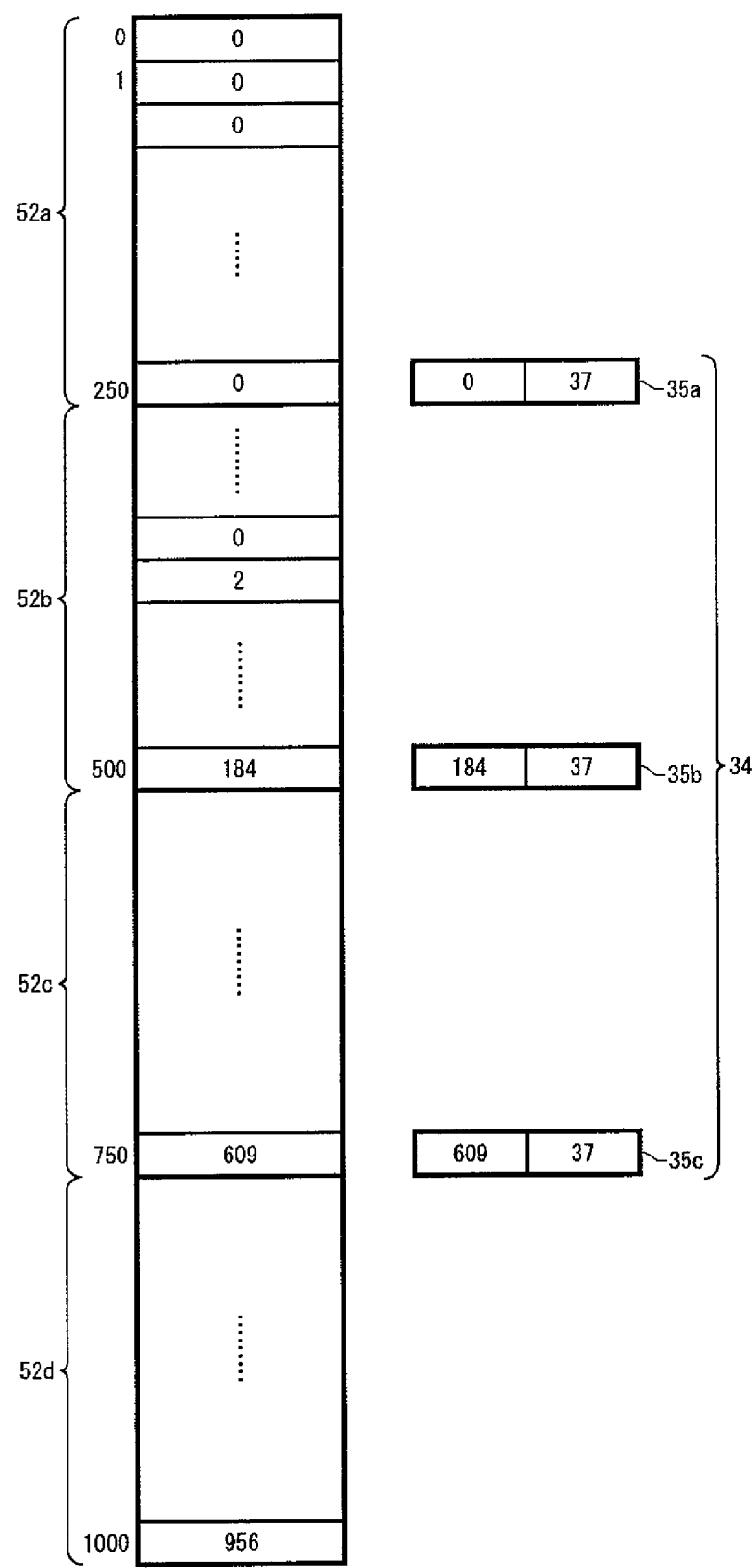
FIG. 8 is a diagram that shows another example of internal data of the first database.

FIG. 8 shows another example of internal data of the first database. In the example shown in FIG. 8, the number of pieces of reference data is smaller than the number of pieces of data storable in the first database 50, i.e., 1000 in this case. In such instance, the first database 50 stores the pieces of reference data in descending order, starting with the last data position therein. Then, 0 is stored in the rest of the data positions. The database is loaded with data not from the top but from the bottom of the loading area, and all the vacancies occurring in the front of the loading area, if any, are replaced with zero. Consequently, the database is fully loaded at any time, so that the search time necessary for binary search will be constant. Moreover, if the binary search circuit 36 reads reference data "0" during a search, the circuit can identify the range without making a comparison, as the comparison result is obvious, and can proceed to the next comparison. Consequently, the search speed can be improved.

In CPU-based software processing, the first database 50 stores pieces of reference data in ascending order, from the first data position therein. In the rest of data positions will be stored a maximum value or the like, and in such case, the skip of comparison processing as described above cannot be made during binary search. The comparison technique described above can be implemented by configuring the search circuit 30 with a dedicated hardware circuit.

Figure 9:
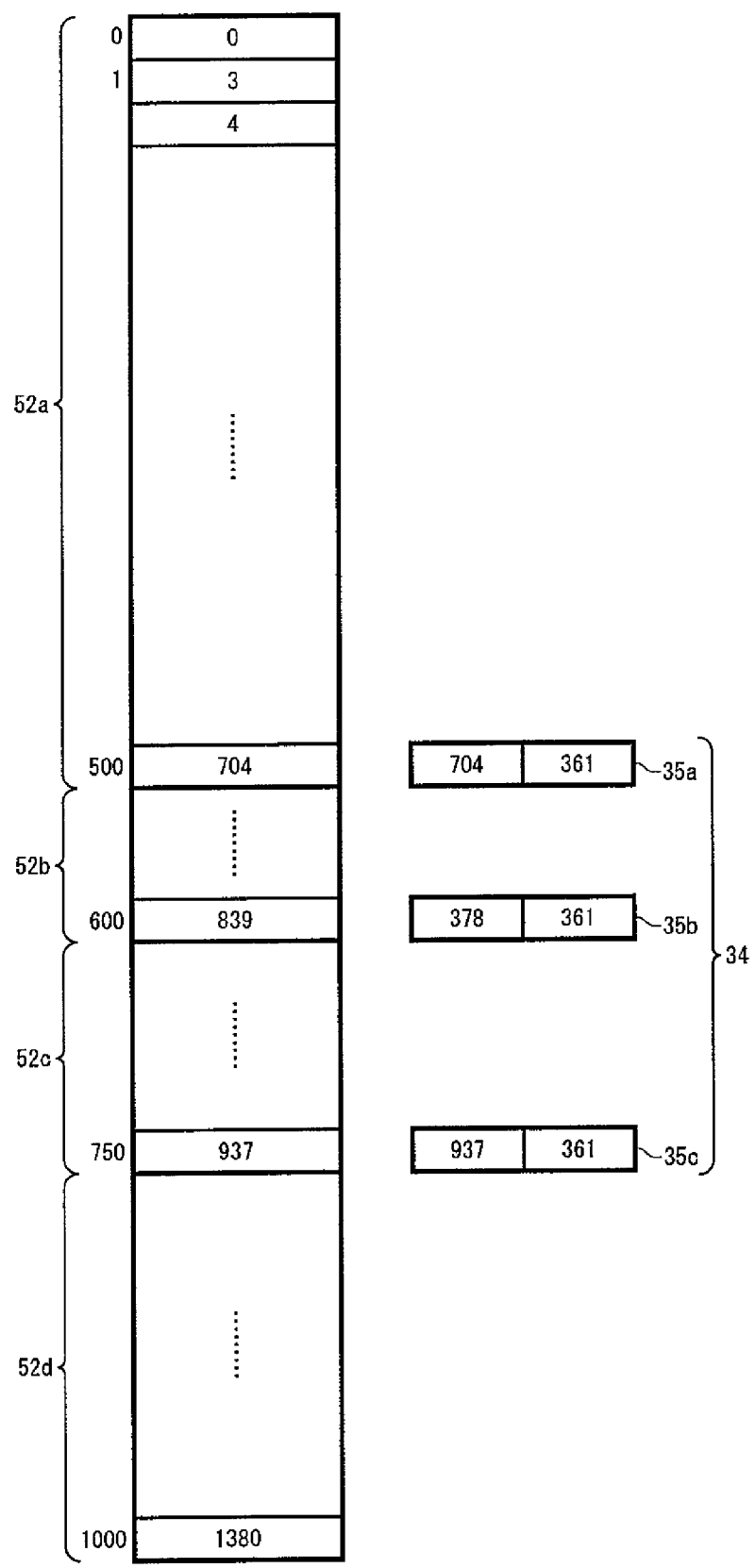
FIG. 9 is a diagram that shows yet another example of internal data of the first database.

FIG. 9 shows yet another example of internal data of the first database. In the example shown in FIG. 9, the reference data is not evenly divided into three or more ranges, but unevenly divided into ranges that accommodate different numbers of pieces of data, such as 500 pieces in the range 52a and 100 pieces in the range 52b. These ranges may be determined depending on the distribution of frequencies with which reference data occurs in communication data. Specifically, the ranges may be determined so that the sums of the frequencies of occurrence of reference data belonging to the respective ranges are almost the same. Accordingly, the search efficiency can be improved. The reference data to be input to the comparison circuits 35a-35c of the index circuit 34 may be modifiable from the outside. In such case, the ranges can be dynamically set, so that the search efficiency will be optimized.

Figure 10:
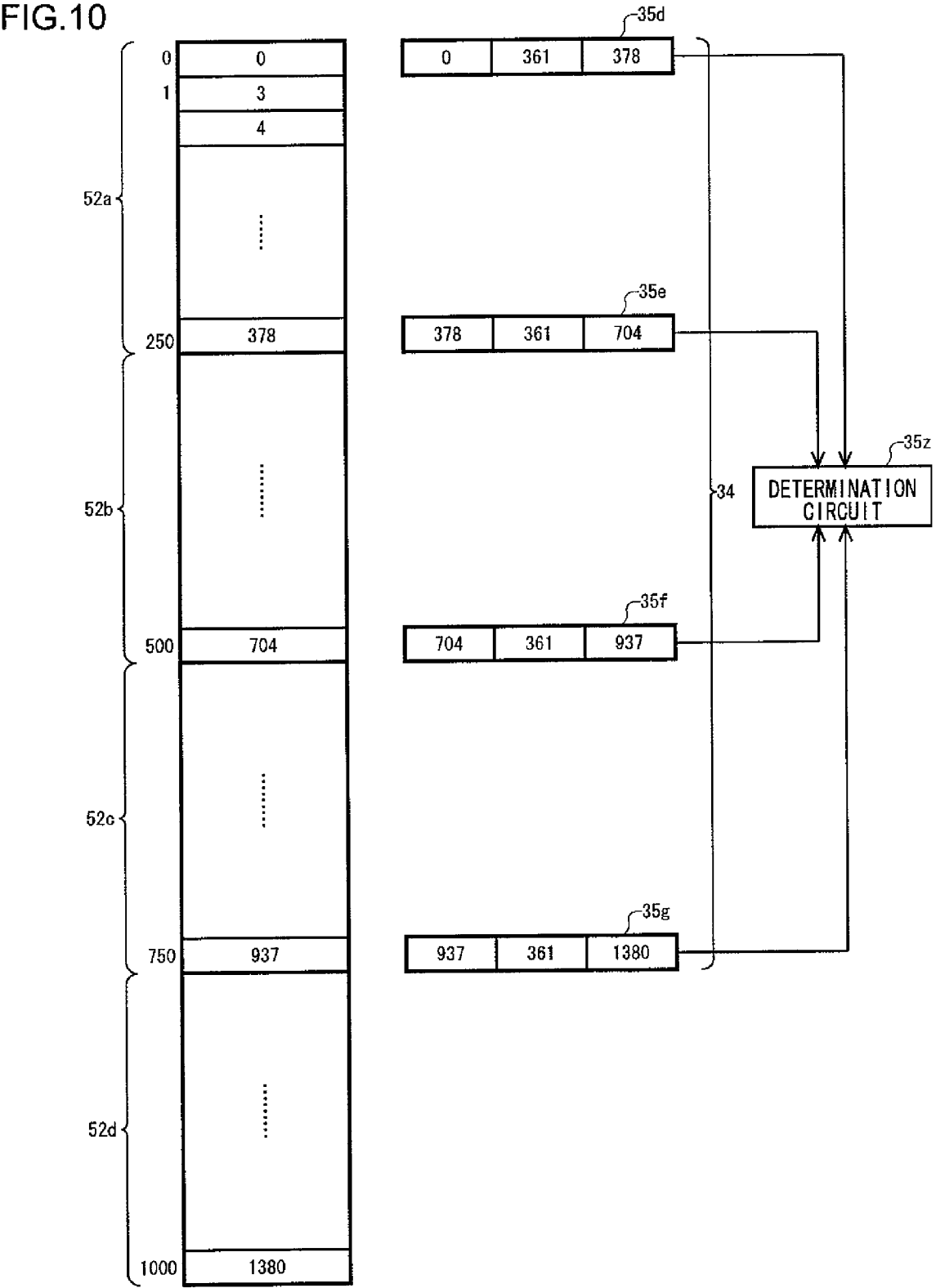
FIG. 10 is a diagram that shows another example of the index circuit.

FIG. 10 shows another example of the index circuit. In the examples of FIGS. 7-9, the index circuit 34 uses the three comparison circuits 35a-35c to determine which range comparison target data belongs to among the four ranges of 52a-52d in the first database 50. In the example shown in FIG. 10, on the other hand, the index circuit 34 is provided with four comparison circuits 35d-35g for determining whether or not comparison target data is included in each of the four ranges 52a-52d. For example, into the comparison circuit 35d are input the 0th and 250th pieces of reference data in the first database 50 and comparison target data. Then, each piece of the reference data is compared to the comparison target data, so as to determine whether or not the comparison target data is included in the range 52a. The comparison results provided by the comparison circuits 35d-35g are input into a determination circuit 35z, which outputs information providing which range the comparison target data is included in. Each of the comparison circuits 35d-35g may output a result indicating whether the comparison target data is included between the two input pieces of reference data, or may output a result indicating that the comparison target data is greater than the range, the comparison target data is included in the range, or the comparison target data is smaller than the range. When it is determined that the comparison target data is not included in any of the ranges 52a-52d, it can be found that the comparison target data does not exist within the first database 50. Accordingly, the search can be terminated without performing any further binary search.

Figure 11:
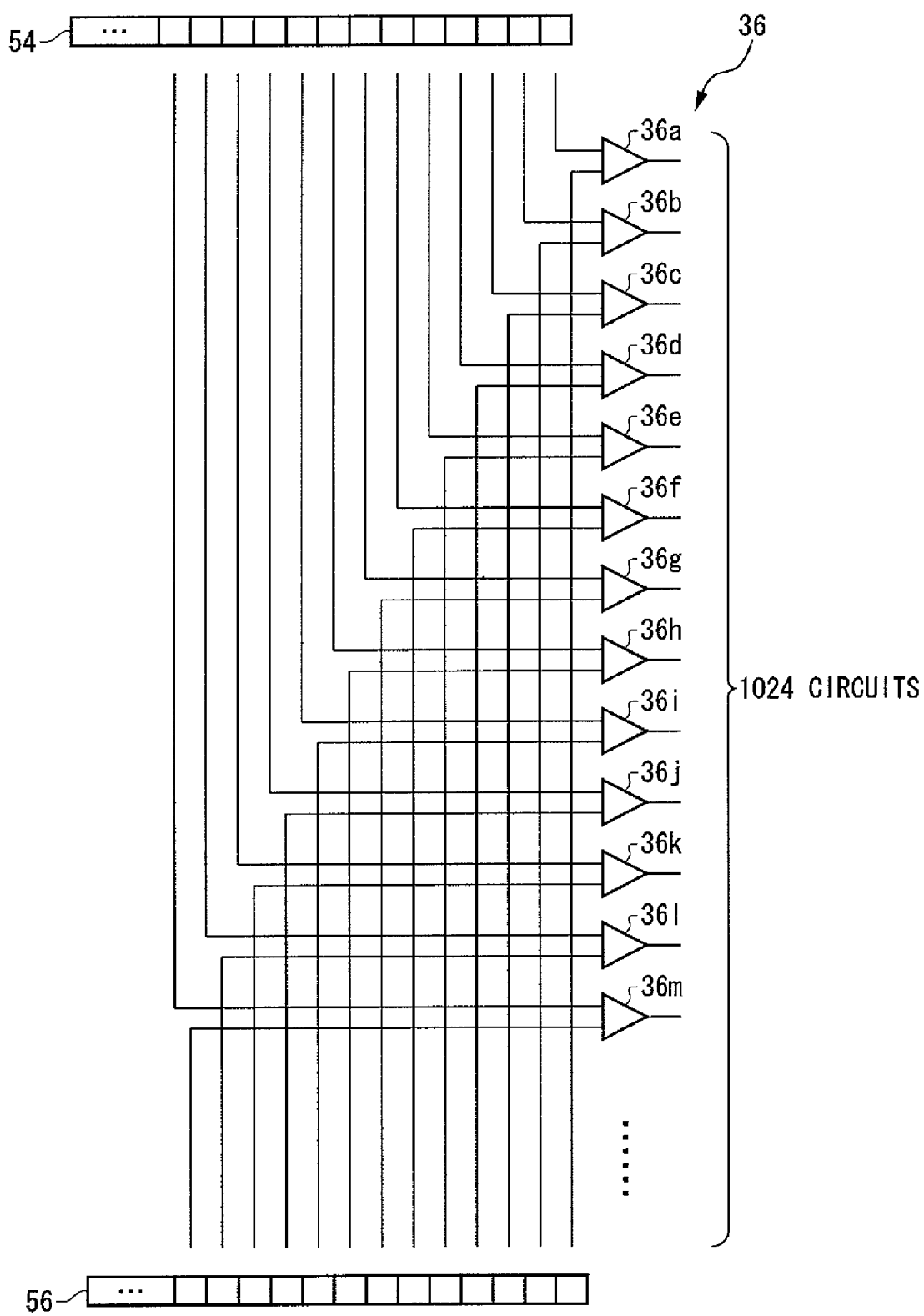
FIG. 11 is a diagram that shows a configuration of a comparison circuit included in a binary search circuit.

FIG. 11 shows a configuration of the comparison circuit included in the binary search circuit. As mentioned previously, the comparison circuit in the binary search circuit 36 includes 1024 comparators, such as 36a, 36b, . . . . Each of the comparators 36a, 36b, etc. receives 1 bit of reference data 54 and 1 bit of comparison target data 56 to compare the bits in value. The comparison circuits 35a-35c of the index circuit 34 have similar internal configurations. Since the comparison processing is thus performed by a dedicated hardware circuit, a large number of comparison circuits can be operated in parallel to compare a large number of bits at a time, thereby speeding up the comparison processing.

Figure 12:
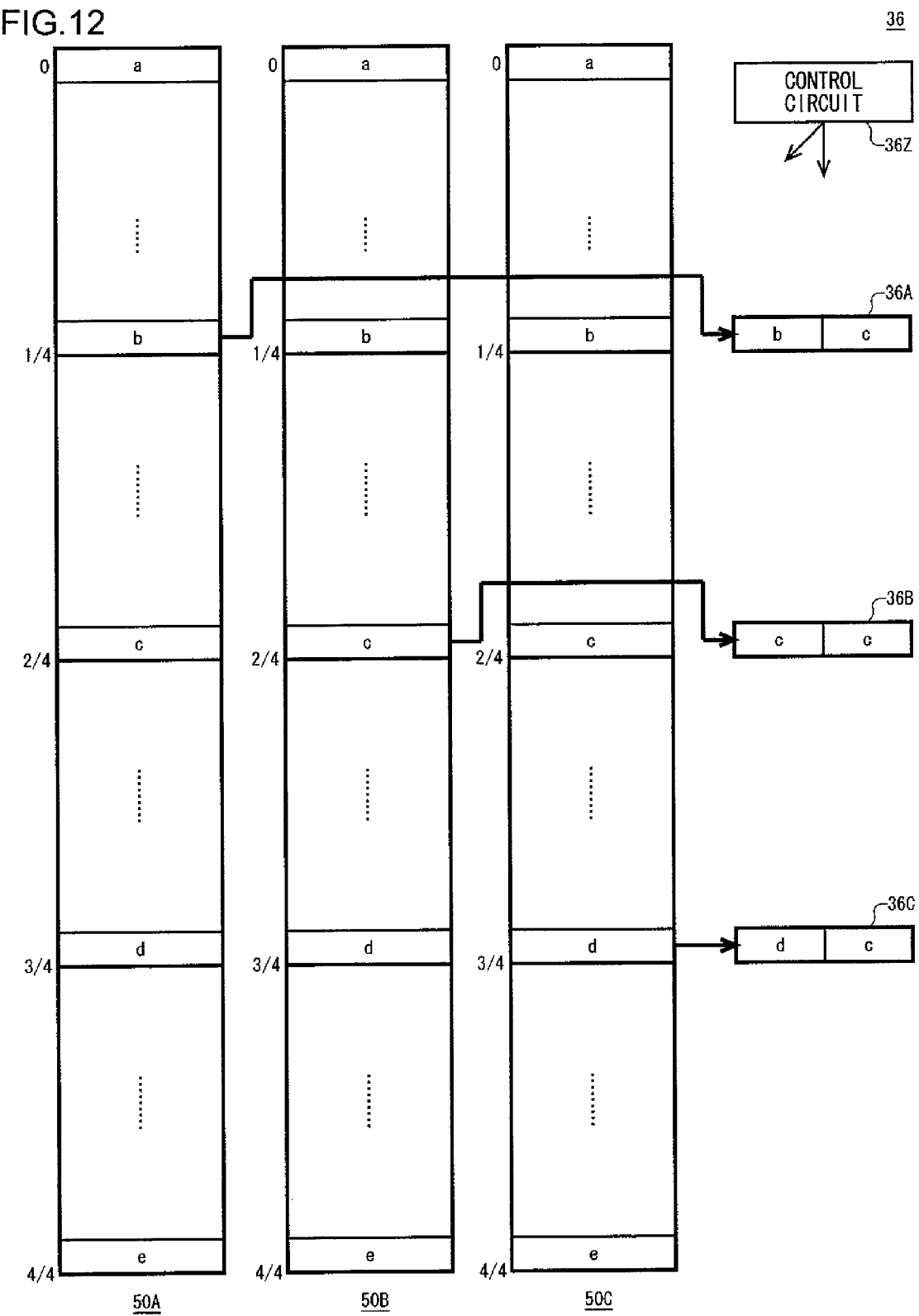
FIG. 12 is a diagram that shows a configuration of the binary search circuit.

FIG. 12 shows a configuration of the binary search circuit. The binary search circuit 36 includes comparison circuits 36A, 36B and 36C, each of which includes the 1024 comparators 36a, 36b, etc. as shown in FIG. 11, and a control circuit 36Z for controlling the comparison circuits.

In a conventional binary search method, a piece of data lying at the one-half position in the search range of a database, in which pieces of data are aligned in ascending or descending order, is read out to be compared with comparison target data in the first search. When the pieces of data are aligned in ascending order and if the comparison target data is smaller than the read out data, it means that the comparison target data might exist within the first half of the search range. Accordingly, in the second search, the search range is newly set to the first half and a piece of data lying at the one-half position in the range, i.e. at the one-quarter position in the original search range, is read out to be compared with the comparison target data. Conversely, if the comparison target data is greater than the read out data, it means that the comparison target data might exist within the second half of the search range. Accordingly, the new search range is set to the second half and a piece of data lying at the one-half position in the range, i.e. at the three-quarter position in the original search range, is read out to be compared with the comparison target data in the second search. In this way, the search range is narrowed by half repeatedly until the target data is reached.

In the present embodiment, in contrast, three comparison circuits are provided for binary search, so that when the data at the one-half position in the search range is compared with comparison target data for the first search, the comparison for the second search between the comparison target data and each of the pieces of data at the one-quarter and three-quarter positions in the search range can be simultaneously performed in parallel. Thus, the first and second searchs can be performed at the same time, thereby reducing the time required to load the data from the database. Also, by operating three comparison circuits in parallel, the number of comparisons can be reduced by half, thereby reducing the search time.

In the example of FIG. 12, three comparison circuits are provided to perform two searchs simultaneously. When n searchs are to be performed simultaneously, $2^n-1$ comparison circuits may be generally provided. The control circuit 36Z inputs each piece of data at the $1/2^n, 2/2^n, \ldots,$ and $(2^n-1)/2^n$ positions in the search range into the $2^n-1$ comparison circuits respectively, and operates the comparison circuits simultaneously in parallel to allow them to compare the respective pieces of data with comparison target data. The control circuit 36Z then acquires the comparison results from the comparison circuits and determines if the comparison target data is found. If any of the comparison circuits output a signal indicating that there has been a data match, the control circuit 36Z will determine that the comparison target data has been found and will terminate the binary search. If there is no such signal output, the process will be shifted to the next search. If the comparison target data exists within the database, the data must lie within a range between points where the comparison results of the $2^n-1$ comparison circuits change. In the case where 15 comparison circuits are provided, for example, if the piece of data at the 5/16 position is smaller than comparison target data and if the piece of data at the 6/16 position is greater than the comparison target data, the comparison target data should lie within the range between the 5/16 and 6/16 positions. Thus, the control circuit 36Z acquires comparison results from the comparison circuits and sets the next search range to a range between points where the comparison results change. The control circuit 36Z then inputs, into the respective comparison circuits, each piece of data at the $1/2^n, 2/2^n, \ldots,$ and $(2^n-1)/2^n$ positions in the next search range thus set.

There are provided the three first databases 50 in the present embodiment; the first database 50A is connected to the comparison circuit 36A and supplies thereto a piece of data at the one-quarter position in the search range; the first database 50B is connected to the comparison circuit 36B and supplies thereto a piece of data at the two-quarter position in the search range; and the first database 50C is connected to the comparison circuit 36C and supplies thereto a piece of data at the three-quarter position in the search range. Therefore, pieces of data can be loaded simultaneously into the comparison circuits in parallel, thereby further reducing the time for data loading and enabling high-speed binary search.

Providing more comparison circuits will improve the search speed. In consideration of cost or size of the system, a sufficient number of comparison circuits may be provided to achieve a desired search speed. Also, although it is desirable that first databases as many as comparison circuits are provided, some comparison circuits may share a database in consideration of cost or size of the system.

FIG. 13 shows still yet another example of internal data of the first database. The first database 50 shown in FIG. 13 stores URLs of contents to which filtering is applied. The data stored in the first database 50 may include predetermined data recognized as a wild card, such as "00H" or "01H". In the example shown in FIG. 13, "*******" is recognized as a wild card in "http://www.xx.xx/*******", and, whatever the comparison target data corresponding thereto is, it is determined in the comparators 36a, 36b, etc. that such data matches the wild card. Accordingly, every character string starting with "http://www.xx.xx/" is detected by the binary search circuit 36. Consequently, processing such as applying filtering to all contents within the domain "http://www.xx.xx/" can be easily performed.

FIG. 14 shows an example of internal data of the second database. The second database 60 includes a search result field 62, which contains a search result of the search circuit 30, and a processing content field 64, which contains a processing content to be performed on communication data. The database stores the search results and the processing contents related to each other. In the example of FIG. 14, conditions are established such that a packet will be allowed to pass if its communication data contains reference data; if not, the packet will be discarded. The process execution circuit 40 searches the second database 60 for a processing content based on the search result and performs the processing on the communication data. The process execution circuit 40 may also be configured with a wired logic circuit.

FIG. 15 shows another example of internal data of the second database. In the example of FIG. 15, the processing content is set for each piece of reference data. With regard to packet replacement, replacement data may be stored in the second database 60. As for packet routing or switching, information on the route may be stored in the second database 60. The process execution circuit 40 performs processing, such as filtering, routing, switching, or replacement, which is specified in the second database 60, in accordance with the search result of the search circuit 30. When the processing content is set for each piece of reference data, as shown in FIG. 15, the first database 50 and the second database 60 may be merged with each other.

The first database and the second database are configured to be rewritable from the outside. By replacing these databases, various types of data processing and communication control can be achieved using the same communication control apparatus 10. Also, multistage search processing may be performed by providing two or more databases that store reference data to be searched. In such instance, more complicated conditional branching may be performed by providing two or more databases that store search results and processing contents related to each other. When multiple databases are thus provided to conduct multistage search, a plurality of the position detection circuits 32, the index circuits 34, the binary search circuits 36, etc. may also be provided.

The data intended for the foregoing comparison may be compressed by the same compression logic. If both the source data and the target data to be compared are compressed by the same method, the comparison can be performed in the same manner as usual, thus reducing the amount of data to be loaded for comparison. The smaller amount of data to be loaded can reduce the time required to read out the data from the memory, thereby reducing the overall processing time. Moreover, the number of comparators can be also reduced, which contributes to the miniaturization, weight saving, and cost reduction of the apparatus. The data intended for comparison may be stored in a compressed form, or may be read out from the memory and compressed before comparison.

The present invention has been described with reference to the embodiment. The embodiment is intended to be illustrative only and it will be obvious to those skilled in the art that various modifications to constituting elements or processes could be developed and that such modifications are also within the scope of the present invention.

INDUSTRIAL APPLICABILITY

The present invention is applicable to a binary search circuit for searching a database for given data.

What is claimed is:

1. A binary search circuit which searches a database storing pieces of data aligned in ascending or descending order for comparison with target data by binary search, the binary search circuit being configured with a wired logic circuit and comprising:

$2^n-1$ comparison circuits which compare pieces of data read out from the database with the comparison target data; and a control circuit which controls the comparison circuits, wherein, when the search range of the database is divided into $2^n$, the control circuit inputs each piece of data at the $1/2^n, 2/2^n, \ldots,$ and $(2^n-1)/2^n$ positions in the search range into the $2^n-1$ comparison circuits respectively and the comparison circuits compare the pieces of data thus input with the comparison target data, so as to perform n searches simultaneously in parallel.

2. The binary search circuit according to claim 1, wherein the control circuit determines if the comparison target data is found based on comparison results from the $2^n-1$ comparison circuits, and, when the comparison target data is not found, the control circuit inputs, into the respective comparison circuits, each piece of data at the $1/2^n, 2/2^n, \ldots,$ and $(2^n-1)/2^n$ positions in a next search range defined based on the comparison results.

3. The binary search circuit according to claim 1, the circuit comprising $2^n-1$ of the databases connected to the respective comparison circuits, wherein the control circuit inputs pieces of data at the $1/2^n, 2/2^n, \ldots,$ and $(2^n-1)/2^n$ positions in the search range in parallel from the databases connected to the respective comparison circuits.

4. A binary search method in which, when a search range of a database storing pieces of data aligned in ascending or descending order is divided into $2^n$, each piece of data at the $1/2^n, 2/2^n, \ldots,$ and $(2^n-1)/2^n$ positions in the search range is input into $2^n-1$ comparison circuits respectively and the comparison circuits compare the pieces of data thus input with comparison target data, so that n searches are performed simultaneously in parallel.

5. The binary search circuit according to claim 2, the circuit comprising $2^n-1$ of the databases connected to the respective comparison circuits, wherein the control circuit inputs pieces of data at the $1/2^n, 2/2^n, \ldots,$ and $(2^n-1)/2^n$ positions in the search range in parallel from the databases connected to the respective comparison circuits.

* * * * *